(12) United States Patent
Rittner et al.

(10) Patent No.: US 8,474,456 B2
(45) Date of Patent: Jul. 2, 2013

(54) OXYGEN BREATHING MASK

(75) Inventors: Wolfgang Rittner, Siblin (DE); Rudiger Meckes, Berkenthin (DE)

(73) Assignee: Intertechnique, S.A. (FR)

( * ) Notice: Subject to any disclaimer, the term of this patent is extended or adjusted under 35 U.S.C. 154(b) by 1009 days.

(21) Appl. No.: 12/475,795

(22) Filed: Jun. 1, 2009

(65) Prior Publication Data

US 2010/0000536 A1    Jan. 7, 2010

Related U.S. Application Data

(60) Provisional application No. 61/057,244, filed on May 30, 2008.

(51) Int. Cl.
*A62B 7/04* (2006.01)
*F16K 31/26* (2006.01)

(52) U.S. Cl.
USPC .................................. 128/204.26; 128/204.28

(58) Field of Classification Search
USPC ............. 128/204.18, 204.26, 204.28, 204.29, 128/205.13, 205.14, 205.24, 205.25, 206.21, 128/206.28, 207.12
See application file for complete search history.

(56) References Cited

U.S. PATENT DOCUMENTS

| | | | | |
|---|---|---|---|---|
| 3,136,312 A * | 6/1964 | Gattone | .................... | 128/205.13 |
| 4,793,342 A * | 12/1988 | Haber et al. | ............. | 128/202.27 |
| 4,823,786 A * | 4/1989 | Silber | ....................... | 128/202.27 |
| 5,265,597 A | 11/1993 | Wallis | | |
| 5,586,551 A * | 12/1996 | Hilliard | .................... | 128/203.29 |
| 7,082,946 B2 * | 8/2006 | Farin et al. | ............... | 128/205.25 |
| 7,445,006 B2 * | 11/2008 | Dhuper et al. | ........... | 128/203.12 |
| 2004/0060560 A1 * | 4/2004 | Stenzler et al. | .......... | 128/206.21 |

FOREIGN PATENT DOCUMENTS

| | | |
|---|---|---|
| DE | 102006025725 | 12/2007 |
| EP | 2090335 A1 | 8/2009 |
| EP | 2092962 A1 | 8/2009 |
| EP | 2127700 B1 | 12/2009 |
| WO | WO2006086044 | 8/2006 |

* cited by examiner

*Primary Examiner* — Justine Yu
*Assistant Examiner* — Michael Tsai
(74) *Attorney, Agent, or Firm* — Dean W. Russell; Kristin M. Crall; Kilpatrick Townsend & Stockton LLP

(57) ABSTRACT

Oxygen breathing masks, as well as methods of providing oxygen to persons, are detailed. The devices may include mechanisms for supplying either oxygen or ambient air to a person depending on inspiration pressure applied by the person to a first volume to which the person's mouth and/or nose is connected.

7 Claims, 1 Drawing Sheet

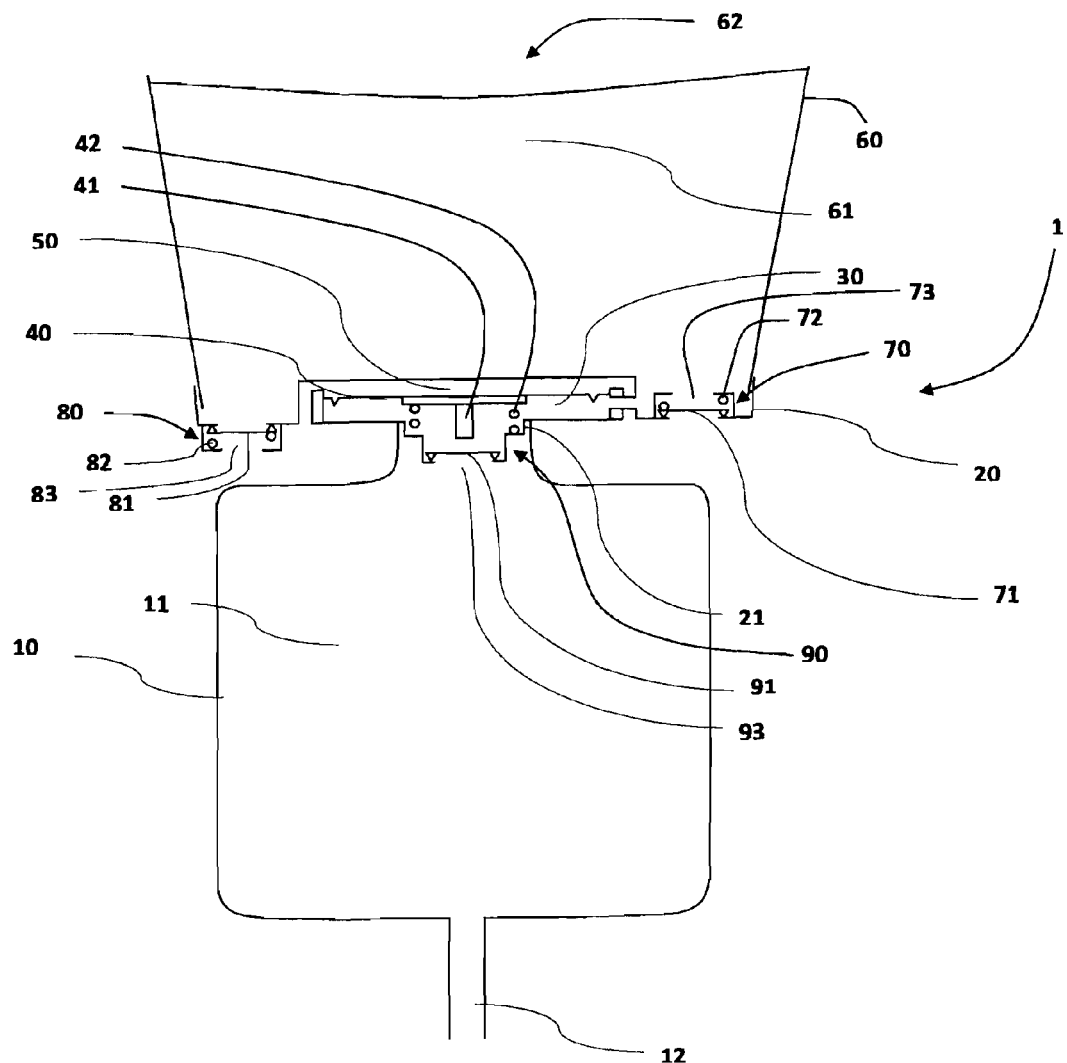

OXYGEN BREATHING MASK

CROSS-REFERENCE TO RELATED APPLICATION

This application claims the benefit of U.S. Provisional Application No. 61/057,244 filed on May 30, 2008, the contents of which are incorporated herein by reference.

FIELD OF THE INVENTION

The invention relates to an oxygen breathing device. In particular, the invention relates to an oxygen breathing mask for such an oxygen breathing device.

BACKGROUND

Oxygen breathing devices are used in a variety of applications where it is required to provide oxygen as singular or supplementary oxygen source to a person. A typical application of such oxygen breathing devices is the emergency oxygen supply system in aircraft provided to passengers or crew members in case of sudden pressure drop or any other emergency where the ambient air condition within the aircraft is negatively affected.

Generally, such oxygen breathing devices comprise an oxygen source like a compressed oxygen tank or chemical oxygen source, an oxygen supply line like an oxygen tube or a flexible oxygen hose for directing a flow of oxygen from the oxygen source to the person to be supplied with oxygen and a pressure regulator for controlling the flow of oxygen from the oxygen source to the person. The oxygen may be provided to the person via an opening arranged close to the mouth or nose of the person or an oxygen mask which can be fixed to the person in such a way that the mouth and/or the nose are covered to define an interior space in front of the mouth and/or nose. Such an interior space can then be provided with a continuous or discontinuous flow of oxygen.

A general problem associated with such oxygen breathing devices lies in the desire to construct such devices lightweight and small but to be able to supply a person for a long period of time with oxygen using the device.

EP 08151600 discloses a chemical oxygen breathing device for long time supply of a person, the device comprising two chemical oxygen generators supplying the person sequentially with oxygen. Such oxygen breathing device will significantly improve the efficiency of oxygen supply and the duration of such supply by reducing the total weight and dimension of the device at the same time. However, it is desirable to further increase the duration of oxygen supply and to further reduce the weight and dimension of such oxygen breathing devices.

EP 08151305 discloses an oxygen breathing device having a self-sustaining energy system. Such device will significantly reduce overall weight of an oxygen supply system within an aircraft and thus allow to provide oxygen sources having more oxygen capacity without increasing the weight of the system in total. However, it is desirable to further improve such oxygen supply systems in order to further reduce the weight and dimension and to further increase the duration of oxygen supply.

SUMMARY OF THE INVENTION

According to the invention, an oxygen breathing mask for oxygen breathing devices is provided, the mask comprising:

i. an oxygen mask body defining an interior space with a first opening adapted to communicate with mouth and/or nose of a person to be supplied with oxygen,
ii. an oxygen bag defining an interior space coupled to an oxygen supply line,
iii. an oxygen supply channel connecting the interior space of the oxygen mask body to the oxygen bag,
iv. an oxygen supply valve arranged to allow or to stop flow of oxygen through the oxygen supply channel,
v. an expiration channel connecting the interior space of the oxygen mask body to ambient space
vi. an expiration valve arranged to allow or to stop flow of expiration air through the oxygen supply channel,
vii. an ambient air inlet channel connecting the interior space of the oxygen mask body to ambient space,
viii. an ambient air inlet valve arranged to allow or to stop flow of inspiration air through the ambient air inlet channel,
ix. wherein the oxygen supply valve is adapted to be open if $p_b - p_m > p_1$ and $p_b - p_m < p_2$, wherein
  $p_b$=pressure in the interior space of the oxygen bag,
  $p_m$=pressure in the interior space of the oxygen mask body,
  $p_1$=first predetermined pressure level,
  $p_2$=second predetermined pressure level, and
  $p_1 < p_2$
x. wherein the ambient air inlet valve is adapted to be open if $p_a - p_m > p_3$ wherein
  $p_a$=ambient pressure, and
  $p_3$=third predetermined pressure level,
xi. wherein the expiration valve is adapted to be open if $p_a - p_m < p_4$, wherein
  $p_4$=fourth predetermined pressure level, and
  $p_4 > p_3$.

In the meaning of this description and the claims the terms pressure, negative pressure, positive pressure are understood to define pressure values which are always positive values. In this meaning, a negative pressure is a pressure which is below the ambient pressure, i.e. in a range between zero and ambient pressure. A positive pressure is understood to be above ambient pressure, i.e. having a pressure value higher than ambient pressure.

According to the invention, an oxygen breathing mask is provided which allows significant increase of the duration of oxygen supply to a person from an oxygen source. Basically, the invention is based on the awareness that a person only uses an initial part of the inhaled air volume for oxygen supply within the lung. A significant part of the inhaled air volume following this initial part is only used as transport gas and is exhaled without having reached the alveoles. This transport part gas of the inhaled air volume is not used by the person to enrich oxygen content and to deplete carbon dioxide in the body, i.e. the blood flowing through the alveoles, respectively.

According to the invention, the oxygen mask is adapted to control the flow of breathing gas in such a way that in a first stage of the inspiration step oxygen is provided to the person from the oxygen bag via the oxygen supply channel and the oxygen mask body. This is achieved by providing an oxygen supply valve which is open in a predetermined condition wherein the person applies a negative inspiration pressure which is in a specific predetermined pressure range. The oxygen is supplied from the oxygen bag which may be supplied with oxygen from the oxygen source via an oxygen supply hose as known in the prior art in a continuous or discontinuous manner. The oxygen bag has a defined interior volume size and usually, the person will inspirate the oxygen contained in this volume faster than new oxygen is supplied to the bag via the oxygen supply hose. Thus, at a specific point in the inspiration cycle, the oxygen bag will be empty. At this point, the negative inspiration pressure will be further decreased by the person to continue inspiration. If such further decrease of the negative inspiration pressure is present within the interior of the oxygen mask body, the pressure difference between the interior of the oxygen mask body and the oxygen bag and the ambient pressure, respectively, will increase. According to the invention, this will result in ambient air flowing into the oxygen mask body via an ambient air inlet channel. This is achieved by an ambient air inlet valve which will open as soon as the oxygen bag is empty and thus produces a decrease of the negative inspiration pressure within the oxygen mask body.

The ambient air which is now inhaled by the person may have a low oxygen level or may even contain no oxygen at all. This ambient air is inhaled in the last phase of the inspiration cycle and only serves as transport gas. Thus, by this ambient air the oxygen which was inhaled before out of the oxygen bag is transported into the lung and the alveoles of the person to be supplied with oxygen.

As soon as the inspiration cycle is terminated, the person will expirate the ambient air and the oxygen as far as it was not consumed in the lung. During this expiration cycle the oxygen supply valve will be shut to prohibit expiration air entering into the oxygen bag. An expiration channel having an expiration valve to control the expiration cycle is provided. It is to be understood that this expiration channel may be integral with the ambient air inlet channel and the ambient air inlet valve and the expiration valve may be integrated into one bifunctional valve device.

Preferably, the oxygen supply from the oxygen bag to the oxygen mask body is completely stopped during supply of ambient air into the oxygen mask body. However, it will be acknowledged by the skilled person that a little flow of oxygen during the last phase of the inspiration cycle from the oxygen bag into the oxygen mask will only result in a mixture of the ambient air and the oxygen in this last phase, thus only effecting a reduction of the efficiency of the oxygen breathing mask according to the invention. However, it is preferred that during the last phase of the inspiration cycle and during the expiration cycle the oxygen bag is shut off from the oxygen mask body and can thus be filled with oxygen again for consummation in the next inspiration cycle.

Basically, it is to be understood that the person supplied with oxygen may significantly decrease the pressure in the interior space of the oxygen mask body by rapid and/or high frequent breathing since the flow resistance in the oxygen supply channel will allow to generate a significant negative pressure in the oxygen mask even though the oxygen supply valve is open and connects the oxygen mask body to the oxygen bag. In the sense of the invention such decrease of oxygen mask pressure resulting from a quick or high frequent breathing, as it may occur in an emergency situation, shall not be understood to result in opening of the ambient air inlet valve or even in closing of the oxygen air supply valve. Such opening and closing procedure shall only occur in case that the oxygen bag is emptied after the first phase of the inspiration cycle and a significant decrease in oxygen mask pressure occurs. Thus, the step of opening the ambient air inlet valve is more or less dependent on the fact if the oxygen bag is filled or emptied and according to the invention the ambient air inlet valve shall open if the oxygen bag is emptied.

In this context, it is to be understood that the oxygen bag may be continuously supplied with oxygen and thus will never be completely emptied in a physical meaning. It is to be understood that, however, the oxygen flow rate flowing from the oxygen to the oxygen mask in the inspiration cycle is much higher than the oxygen flow rate of the continuous supply of oxygen. Thus, in the course of the inspiration cycle the oxygen bag will be practically emptied after a certain period of time of the inspiration cycle and this will be the point, where the ambient air inlet valve shall open and the oxygen supply valve shall preferably close. It is to be understood that after this opening of the ambient air inlet valve and in particular if the oxygen supply valve closes at this point of time, the flow of oxygen from the oxygen bag to the oxygen mask may significantly decrease and this is a particular advantage of the invention. However, due to this decrease of the oxygen flow the oxygen bag may be filled by the continuous supply via the oxygen supply line after this point. It is preferred that the oxygen bag is filled at such rate that together with the subsequent filling during the expiration cycle the oxygen bag is completely filled again when the next inspiration cycle will start.

According to a first preferred embodiment, the pressure in the interior space of the oxygen bag $p_b$ is equal to the ambient pressure $p_a$ if the bag is filled with oxygen and the third predetermined pressure level $p_3$ is equal or higher than the second predetermined pressure level $p_2$. This improvement allows to construct the oxygen bag as a resilient bag attached to the oxygen mask body and being exposed to ambient pressure with its external surface. In such case, the interior of the oxygen bag will usually be under ambient pressure. Only in exceptional cases where excess oxygen is filled into the oxygen bag if it is already in a completely filled status the pressure inside the oxygen bag may be higher than the ambient pressure. However, preferably the predetermined pressure levels $p_1$-$p_4$ are selected such that the $p_b$ is always below or equal to ambient pressure.

According to a further preferred embodiment,
the oxygen supply valve is adapted to be shut if $p_b-p_m \leq p_1$ and/or $p_b-p_m \geq p_2$,
the ambient air inlet valve is adapted to be shut if $p_a-p_m \leq p_3$ and/or
the expiration valve is adapted to be shut if $p_a-p_m \geq p_4$.

It is particularly preferred that the closing condition for all three different valves is included and it is to be understood that these conditions may be included even if two of the valves are realized in an integrated valve device like e.g. the ambient air inlet valve and the expiration valve as discussed before. In such case, it can in particular be realized that in the course of ambient air inlet into the mask, no further oxygen is provided from the oxygen bag to the oxygen mask body, thus efficiently saving oxygen from the oxygen source. As discussed before, the two additional conditions for the ambient air inlet valve and the expiration valve can be included by one single integrated valve device which is open if the pressure in the oxygen mask is below a certain first level in relation to the ambient pressure and is above a certain second level in relation to the ambient pressure, thus allowing to introduce ambient pressure in the last phase of the inspiration cycle and to expirate air during the expiration cycle into the ambient atmosphere.

According to a still further preferred embodiment, the ambient air inlet valve, the expiration valve and/or the oxygen supply valve is spring-biased into the closed position. The spring-biasing may be accomplished by providing a separate spring element like a coil spring or the like or by implementing a biasing effect into a member like the valve body of the valve, respectively.

According to a still further preferred embodiment of the invention, the oxygen supply valve comprises a first valve unit provided in the oxygen supply channel and a membrane separating the oxygen supply channel from ambient pressure, wherein the membrane is coupled to an engaging member, the engaging member moving the first valve unit into the closed position if the membrane is in a position where $p_b-p_m \leq p_1$. With this embodiment, the oxygen flow from the oxygen bag into the oxygen mask body is made dependent from the difference between the pressure inside the oxygen mask body and the ambient pressure. The membrane may be spring-biased into a position where the oxygen inlet valve is not set into a closed position by the engaging member. As soon as the pressure inside the oxygen mask body falls below a predetermined level in relation to the ambient pressure the membrane may be deflected, thus bringing the engagement member in contact to the oxygen inlet valve and effecting a closing of this valve. It is particularly preferred that the engaging member moves the oxygen inlet valve into the closed position at the same pressure conditions wherein the ambient air inlet valve is opened to introduce ambient air into the oxygen mask body.

According to a still further preferred embodiment, the oxygen breathing mask according to the invention can be improved by comprising an oxygen mask frame coupling the oxygen bag to the oxygen mask body, wherein the ambient air inlet valve, the expiration valve and/or the oxygen supply valve are arranged at said mask frame. Such oxygen mask frame will provide a rigid basis for attaching the oxygen mask body and the oxygen bag to the frame and thus coupling said body and bag via the frame. The frame serves to define a specific geometry which is particularly adapted for the oxygen mask body to perfectly fit to the mouth and/or nose and to establish a tight connection to the person for supplying the oxygen.

According to a still further preferred embodiment,
- p1 is selected such that oxygen is flowing from the oxygen bag to the oxygen mask body if a user applies a first negative inspiration pressure,
- p2 and p3 are selected such that no oxygen is flowing from the oxygen bag to the oxygen mask body and ambient air is flowing into the oxygen mask body if the oxygen bag is emptied and the user applies a second negative inspiration pressure being below the first negative inspiration pressure, and
- p4 is selected such that no oxygen is flowing from the oxygen bag to the oxygen mask body and no ambient air is flowing into the oxygen mask body and expiration air is flowing from the oxygen mask body through the expiration channel if the user applies a positive expiration pressure.

With this embodiment, a sequence is established, wherein the person receives oxygen from the oxygen bag only in a first phase of the inspiration cycle, hereafter the oxygen flow from the oxygen bag into the oxygen mask body is stopped and the person receives ambient air from the ambient inlet only in a second phase of the inspiration cycle and the person will expirate the air through the expiration channel in the expiration cycle, whereby the oxygen flow channel is closed and the ambient air inlet valve is closed as well.

Using such oxygen breathing mask will allow to save up to 25% of the oxygen since only such oxygen volume is supplied to the person which can be used in the alveoles of the lung of the person and no oxygen is used as transport gas.

According to a second aspect of the invention, a method for supplying oxygen to a person is provided, the method comprising the steps of:
i. connecting mouth and/or nose of the person with a first volume,
ii. supplying oxygen to a second volume,
iii. providing oxygen from the second volume to the first volume if the person applies a first negative inspiration pressure to the first volume,
iv. providing ambient air to the first volume if the person applies a second negative inspiration pressure to the first volume, said second negative inspiration pressure being below said first negative inspiration pressure,
v. exhausting expiration air from the first volume to ambient space if the person expirates.

The method is particularly adapted to being accomplished using an oxygen breathing mask as described beforehand.

Alternatively, the invention may be comprised in a method for supplying oxygen to a person, comprising the steps of:
i. connecting mouth and/or nose of the person with a first volume,
ii. supplying oxygen to a second volume being defined within a flexible bag,
iii. providing oxygen from the second volume to the first volume if the person applies a negative inspiration pressure to the first volume,
iv. providing ambient air to the first volume if the flexible bag is emptied, exhausting expiration air from the first volume to ambient space if the person expirates.

Such method is particularly adapted for being accomplished using an oxygen breathing mask as described beforehand.

The methods according to the invention may be improved in that oxygen flow from the second volume to the first volume is stopped in step iv and in step v. This will significantly save oxygen and thus allow elongation of the oxygen supply period to the person.

According to a still further preferred embodiment, the method may be improved in that oxygen is continuously provided from an oxygen source to the second volume. By this, the continuous flow of oxygen may be used to fill an oxygen bag constituting the second volume during the second phase of the inspiration cycle and the complete expiration cycle, thus providing a volume of oxygen in the oxygen bag which is sufficient for the supply in the next first phase of the next inspiration cycle.

BRIEF DESCRIPTION OF THE DRAWING

A preferred embodiment of the invention is described with reference to the attached FIGURE.

The FIGURE shows a schematic sectional side view of a preferred embodiment of the oxygen breathing mask according to the invention.

DETAILED DESCRIPTION

The oxygen breathing mask 1 according to the invention comprises an oxygen bag 10 which is resilient and flexible and preferable made from a elastomeric resilient rubber material or the like. The oxygen bag 10 defines an interior space 11 which is supplied with oxygen via an oxygen supply hose 12 in a continuous manner. The oxygen supply hose 12 is connected to an oxygen source like a chemical oxygen generator or a pressurized oxygen tank.

The oxygen bag is coupled on the opposite side of the oxygen supply tube 12 to an oxygen mask frame 20 made from a rigid plastic material. A flange 21 is provided at the oxygen mask frame 20 to couple the oxygen bag 10 to the oxygen mask frame.

Within the flange 21 an oxygen inlet valve 90 is arranged having oxygen inlet valve body 91 which is spring-biased into the closed position with a very low biasing force. The oxygen inlet valve 90 closes an oxygen inlet opening 93 in the closed position. An oxygen supply channel 30 extends from the oxygen inlet opening 93 in a coaxial direction with respect to the flange 21 and then is directed into a radial direction with respect to said flange 21. The oxygen supply channel 30 exits on the upper side of the oxygen mask frame 20.

As can be seen from the FIGURE, the oxygen supply channel 30 is delimited on the upper side by a membrane 40. The membrane 40 separates the oxygen supply channel 30 from an ambient air space 50. The membrane is spring-biased by a biasing spring 42 and thus held in a position which is in a distance from the oxygen inlet valve 90.

An engaging pin 41 is attached to the membrane 40 and extends in the direction to the oxygen inlet valve 22. In the position shown in the FIGURE, a small distance is provided between the end of the engaging pin 41 and the oxygen inlet valve body 91, thus allowing the oxygen inlet valve body to move into the open position. If the pressure in the oxygen supply channel falls below a certain value, a force will act onto the membrane and this force will overcome the spring force of biasing spring 42. In such case, the membrane will move into the direction of the oxygen inlet valve, thus bringing the lower end of the engaging pin 41 in contact with the oxygen inlet valve body 91. By this, the oxygen inlet valve is pushed into the closed position and oxygen flow from the oxygen bag into the oxygen supply channel is interrupted.

The oxygen supply channel 30 exits on the other end into an interior space 61 of an oxygen mask body 60. Said oxygen mask body 60 is shaped to conform to mouth and nose and to cover mouth and nose of a person which is to be supplied with oxygen. A large opening 62 is provided at the oxygen mask body 60 which allows to take up nose and mouth of the person.

In the oxygen mask frame 20 an ambient air inlet channel 73 is provided having ambient air inlet valve 70 with an ambient air inlet valve body 71 which is spring-biased via a spring 72 into the closed position. The ambient air inlet valve body 71 separates the ambient air pressure on the outside of the oxygen mask body from the pressure inside the oxygen mask body. In case that the pressure inside the oxygen mask body drops below a predetermined level, the biasing force of the spring 72 will be overcome and the ambient air inlet valve will open, thus allowing ambient air to enter into the oxygen mask body.

The biasing forces of spring 42 and 72 are adapted such that the ambient air inlet valve 70 opens at the same pressure condition inside the oxygen mask body where the oxygen inlet valve 90 is closed by engagement of the engagement pin 41 due to downward movement of the membrane 40.

Still further, an expiration valve 80 having an expiration valve body 81 which is spring-biased via a spring 82 into the closed position is provided within expiration channel 83. The expiration valve body 81 separates the oxygen mask body interior from the ambient pressure. If the pressure inside the oxygen mask interior exceeds a certain value, the biasing force of spring 82 will be overcome and the expiration valve will move into the open position. This will allow expiration air to exit the oxygen mask body via the expiration valve 80. At the same time, such pressure increase inside the oxygen mask body will move the ambient air inlet valve and the oxygen inlet valve into the closed position or enforce such closed position by pressure difference, respectively.

The method according to the invention will work as follows:

At the beginning of the inspiration cycle, the oxygen bag 10 is in a filled status by previous oxygen supply via the oxygen supply hose 12. A person to be supplied with oxygen takes the mask and covers his/her nose and mouth with opening 62. As soon as the person starts to inhale a certain drop of pressure inside the oxygen mask body will be present. Since the oxygen bag is under ambient pressure, this drop of pressure inside the oxygen mask body will move the oxygen inlet valve body 91 into the open position, thus allowing flow of oxygen through the oxygen supply channel 30 into the oxygen mask body and thus into the lung of the person.

Since the continuous oxygen flow via oxygen supply hose 12 is much smaller than the oxygen flow through oxygen supply channel 30 in the first phase of the inspiration cycle, the oxygen bag will be emptied after a certain period of time of the inspiration cycle. At this point of time, the pressure inside the oxygen mask body will significantly drop since the person will make an attempt to further proceed the inspiration cycle. This drop of pressure inside the oxygen mask body will move the membrane 40 in the direction of the oxygen inlet valve 90 and thus close the oxygen inlet valve by engagement of the engagement pin 41 with the oxygen inlet valve body 91. By this, oxygen flow from the oxygen bag into the oxygen mask body is interrupted. At the same time, the drop of pressure inside the oxygen mask body will open the ambient air inlet valve 70, thus allowing ambient air to enter into the oxygen mask body. The person will thus be able to proceed with the inspiration cycle and will not even notice that the gas entering into the oxygen mask body in this second phase of the inspiration cycle is no longer oxygen but ambient air. The ambient air flowing through the ambient air inlet valve into the oxygen mask body serves as a transport gas to further push the oxygen inspirated in the first phase of the inspiration cycle into the lung of the person.

After the second phase of the inspiration cycle has ended and the person starts to expirate, the increase of pressure inside the oxygen mask body in the course of start of the expiration cycle will close the ambient air inlet valve 70 at once. Still further, this increase of pressure inside the oxygen mask body will move the membrane upwards and the engagement pin 41 will disengage from the oxygen inlet valve body 91. The oxygen inlet valve 90, however, will stay in the closed position since the increase of pressure will push the oxygen inlet valve body 91 downwards and thus keep the oxygen inlet valve closed.

The increase of pressure inside the oxygen mask body will act onto the expiration valve body 81 and open the expiration valve, thus allowing expiration through the expiration valve 80.

During the second phase of the inspiration cycle and the expiration cycle, the continuous flow via oxygen supply hose 12 will again fill the oxygen bag 10 with oxygen. Thus, after completing the expiration cycle, the oxygen bag 10 will be filled again with oxygen and the next inspiration cycle can start with the first phase of the inspiration cycle.

The invention claimed is:

1. An oxygen breathing mask, comprising:
   (i) an oxygen mask body defining an interior space with a first opening adapted to communicate with mouth and/or nose of a person to be supplied with oxygen,
   (ii) an oxygen bag defining an interior space coupled to an oxygen supply line,
   (iii) an oxygen supply channel connecting the interior space of the oxygen mask body to the oxygen bag,
   (iv) an oxygen supply valve arranged to allow or to stop flow of oxygen through the oxygen supply channel,
   (v) an expiration channel connecting the interior space of the oxygen mask body to ambient space
   (vi) an expiration valve cooperating with the expiration channel and arranged to allow or to stop flow of expiration air through the expiration channel,
   (vii) an ambient air inlet channel connecting the interior space of the oxygen mask body to ambient space, (viii) an ambient air inlet valve cooperating with the ambient air inlet channel and arranged to allow or to stop flow of inspiration air through the ambient air inlet channel, said ambient air inlet valve being arranged parallel to said oxygen supply valve such that air delivered through the oxygen supply channel does not pass the ambient air inlet valve, (ix) wherein the oxygen supply valve is adapted to be open if $p_b-p_m>p_1$ and $p_b-p_m<p_2$, wherein
  $p_b$=pressure in the interior space of the oxygen bag,
  $p_m$ pressure in the interior space of the oxygen mask body,
  $p_1$=first predetermined pressure level,
  $p_2$=second predetermined pressure level, and
  $p_1<p_2$ (x) wherein the ambient air inlet valve is adapted to be open if $p_a-p_m>p_3$ wherein
  $p_a$=ambient pressure, and
  $p_3$=third predetermined pressure level, (xii) wherein the expiration valve is adapted to be open if $p_a-p_m<p_4$, wherein
  $p_4$=fourth predetermined pressure level, and
  $p_4>p_3$, wherein the oxygen supply valve comprises an oxygen inlet valve body provided in the oxygen supply channel and a membrane separating the oxygen supply channel from ambient pressure, wherein said membrane is coupled to an engaging member, the engaging member moving an oxygen inlet valve body into the closed position if the membrane is in a position where $p_b-p_m\leq p_1$ in order to deliver ambient air only.

2. Oxygen breathing mask according to claim 1, wherein the oxygen supply valve is adapted to be closed if $p_b-p_m\leq p_1$ and/or $p_b-p_m\geq p_2$,
the ambient air inlet valve is adapted to be closed if $p_a-p_m\leq p_3$ and/or
the expiration valve is adapted to be closed if $p_a-p_m\geq p_4$.

3. Oxygen breathing mask according to claim 1, wherein the ambient air inlet valve, the expiration valve and/or the oxygen supply valve is spring-biased into the shut position.

4. Oxygen breathing mask according to claim 1, further comprising an oxygen mask frame coupling the oxygen bag to the oxygen mask body, wherein the ambient air inlet valve, the expiration valve and/or the oxygen supply valve are arranged at said mask frame.

5. Oxygen breathing mask according to any of the preceding claims, wherein
  p1 is selected such that oxygen is flowing from the oxygen bag to the oxygen mask body if a user applies a first negative inspiration pressure,
  p2 and p3 are selected such that no oxygen is flowing from the oxygen bag to the oxygen mask body and ambient air is flowing into the oxygen mask body if the oxygen bag is emptied and the user applies a second negative inspiration pressure being below the first negative inspiration pressure, and
  p4 is selected such that no oxygen is flowing from the oxygen bag to the oxygen mask body and no ambient air is flowing into the oxygen mask body and expiration air is flowing from the oxygen mask body through the expiration channel if the user applies a positive expiration pressure.

6. A method for supplying oxygen to a person, comprising the steps of:
  (i) connecting mouth and/or nose of the person to a first volume,
  (ii) supplying oxygen to a second volume being defined within a flexible bag,
  (iii) providing oxygen from the second volume to the first volume via an oxygen supply valve and channel if the person applies a first negative inspiration pressure to the first volume,
  (iv) providing ambient air to the first volume via an ambient air inlet valve and channel if the person applies a second negative inspiration pressure to the first volume, said second negative inspiration pressure being below said first negative inspiration pressure, and
  (v) if the flexible bag is emptied, exhausting expiration air from the first volume to ambient space via an expiration valve and channel if the person expirates wherein oxygen flow from the second volume to the first volume is stopped in step (iv) and in step (v) via the closure of the oxygen supply valve and said ambient air is provided via an ambient air supply channel arranged parallel to the oxygen supply channel for providing said oxygen such that air delivered through the oxygen supply channel does not pass the ambient air supply channel, and wherein oxygen flow from the second volume to the first volume is stopped if the pressure in said first volume is above a predetermined level above the pressure in said second volume in order to deliver ambient air only.

7. A method according to claim 6, wherein oxygen is continuously provided from an oxygen source to the second volume.

* * * * *